United States Patent
Van Den Broek et al.

(10) Patent No.: US 11,897,680 B2
(45) Date of Patent: Feb. 13, 2024

(54) THREE-DIMENSIONAL FILM SEALING

(71) Applicants: Philip Richard Johnson, Littlestone (GB); Lucas Karel Johannes Van Den Broek, Raamsdonk (NL); Louis Rinze Henricus Adrianus Willemsen, Dorst (NL)

(72) Inventors: Lucas Karel Johannes Van Den Broek, Raamsdonk (NL); Louis Rinze Henricus Adrianus Willemsen, Dorst (NL)

(73) Assignee: Philip Richard Johnson, Littlestone (GB)

( * ) Notice: Subject to any disclaimer, the term of this patent is extended or adjusted under 35 U.S.C. 154(b) by 0 days.

(21) Appl. No.: 17/929,164

(22) PCT Filed: Mar. 3, 2021

(86) PCT No.: PCT/NL2021/050144
§ 371 (c)(1),
(2) Date: Sep. 1, 2022

(87) PCT Pub. No.: WO2021/177824
PCT Pub. Date: Sep. 10, 2021

(65) Prior Publication Data
US 2023/0137085 A1  May 4, 2023

(30) Foreign Application Priority Data
Mar. 3, 2020 (NL) ........................ 2025035

(51) Int. Cl.
*B65D 1/44* (2006.01)
*B65D 81/26* (2006.01)
(Continued)

(52) U.S. Cl.
CPC .......... *B65D 77/2024* (2013.01); *B65B 51/10* (2013.01); *B65D 1/34* (2013.01);
(Continued)

(58) Field of Classification Search
CPC .......................... B65D 81/261; B65D 81/262; B65D 77/2024; B65D 25/24
(Continued)

(56) References Cited

U.S. PATENT DOCUMENTS 7,124,883 B1 * 10/2006 Thomas ................. B65D 85/10
206/256
9,546,033 B2 * 1/2017 Everingham ...... B65D 81/3294
(Continued)

FOREIGN PATENT DOCUMENTS

| | | | |
|---|---|---|---|
| EP | 3114045 A1 | 1/2017 | |
| FR | 2947252 A1 * | 12/2010 | ......... B65D 77/2024 |
| JP | 2014015226 A | 1/2014 | |

*Primary Examiner* — Mollie Impink
(74) *Attorney, Agent, or Firm* — BROWDY AND NEIMARK, PLLC

(57) ABSTRACT

Described is an assembly (1) comprising a wall element (2), defining a circumferential bonding strip (3) running over the wall element, and a flexible flat film connected to the bonding strip with a continuous circumferential bonding (4), which wall element and film define two opposite walls (2*a*, 5*a*) of a chamber (5), characterized in that the wall element further comprises a base plane B defined by the wall element, at least two corner elements (6*a*, 6*b*, 6*c*, 6*d*) positioned on a distance to one another, which extend substantially perpendicular with a height H (Ha, Hb, Hc, Hd) in the same direction from the base plane of the wall element, each corner element defining an angle A (Aa, Ab, Ac, Ad) of the chamber with an angle line which is substantially perpendicular to the base plane, strip sections (7*a*, 7*b*, 7*c*, 7*d*), each connecting two corner elements that define adjacent corners of the chamber to one another, the distance
(Continued)

between the strip sections and the base plane being less than H, wherein the continuous circumferential bonding strip runs over the strip sections and over the corner elements and at least in the area of the corner elements at a distance from the base surface corresponding to height H (Ha, Hb, Hc, Hd), and wherein the outer contour of the film is shaped in such a way that the outer contour of the film corresponds to that of the circumferential bonding strip. A method for the production of such an assembly is also described.

18 Claims, 14 Drawing Sheets

(51) Int. Cl.
    *B65D 77/20*     (2006.01)
    *B65B 51/10*     (2006.01)
    *B65D 1/34*     (2006.01)

(52) U.S. Cl.
    CPC ............. *B65D 1/44* (2013.01); *B65D 81/261* (2013.01); *B65D 81/262* (2013.01)

(58) Field of Classification Search
    USPC .............................. 220/504, 527, 625, 359.1
    See application file for complete search history.

(56) References Cited

U.S. PATENT DOCUMENTS

| | | | |
|---|---|---|---|
| 2009/0114552 A1* | 5/2009 | Hall | ..................... B65D 81/265 206/0.5 |
| 2015/0129594 A1 | 5/2015 | Exner et al. | |
| 2017/0001787 A1 | 1/2017 | Inagaki et al. | |

* cited by examiner

A  B

C  D

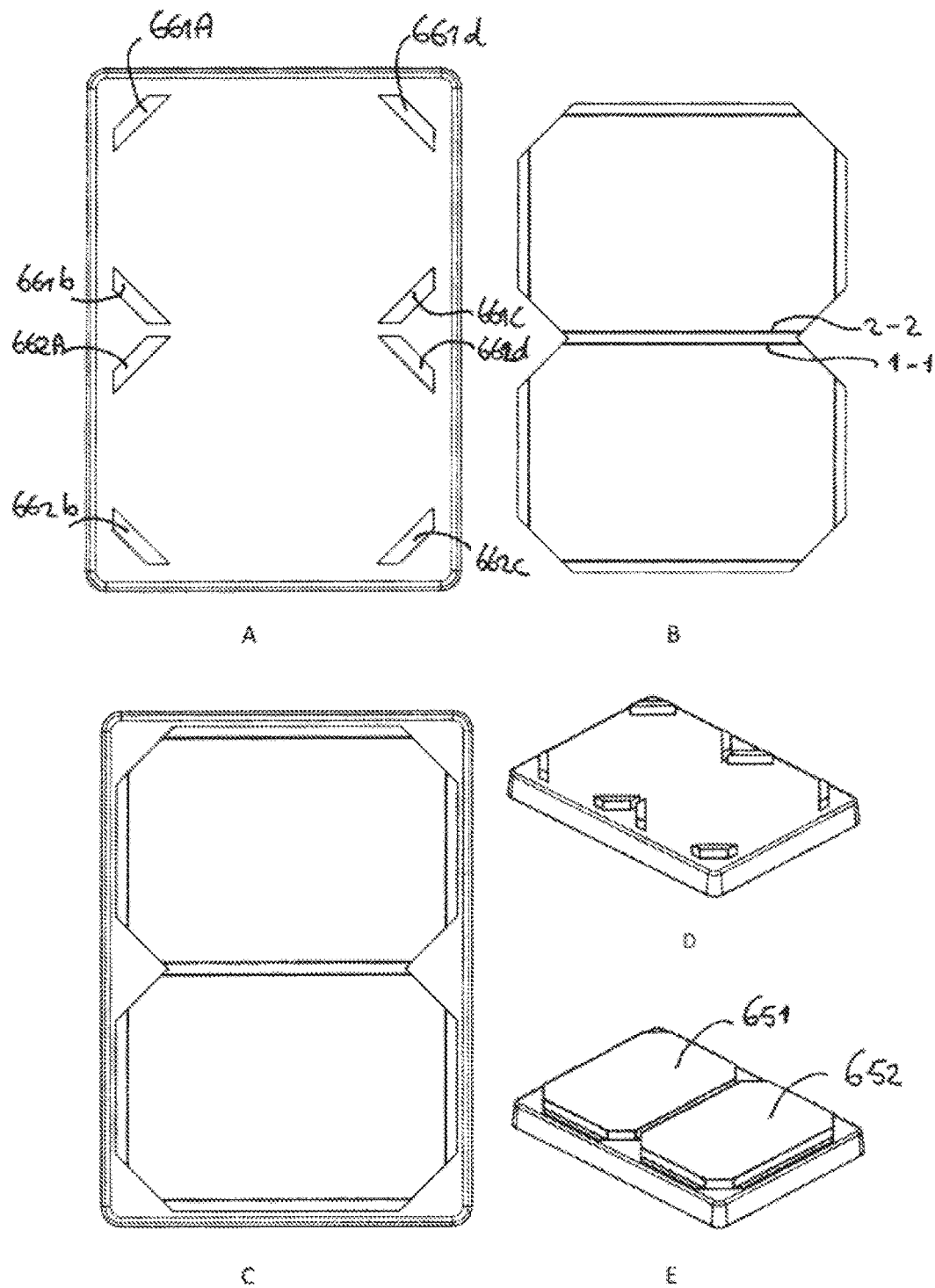
Fig 6A-E

THREE-DIMENSIONAL FILM SEALING

The invention relates to an assembly comprising a wall element, defining a circumferential bonding strip running over the wall element, and a flexible flat film connected to the bonding strip with a continuous circumferential bonding, which wall element and film define two opposite walls of a chamber and to a method of manufacture of such an assembly.

Such an assembly is known from, for example, EP3114045. In the embodiment shown in FIG. 13 of EP3114045, a receptacle for packaging fresh produce made of a thermoplastic material is described, wherein the bottom side of this receptacle defines a wall element, which wall element is bounded by a circular shoulder, which shoulder defines a circumferential bonding strip, to which a pliable flat film of likewise thermoplastic material is attached by holding the film against the bonding strip and connecting to the wall element with a heat weld. This defines a chamber between the wall element and the film. According to EP3114045, the bonding of the film to the wall element takes place in a single plane, thus avoiding bending of the film at the bonding and the chamber formed is limited by the film extending over only one plane.

One of the disadvantages of the holder configuration according to EP3114045 is that the film has to be placed in a precisely fitting manner on the circumferential bonding strip of the wall element in order to obtain a sealing connection between the film and the wall element and thus to define a leak-free chamber. This configuration requires such a low tolerance of the packaging machines that it has not been possible so far to manufacture packaging with this configuration on an industrial scale.

The invention intends to eliminate, inter alia, the above-mentioned problem and is characterised to this end in that the wall element further comprises a base plane B defined by the wall element, at least two corner elements positioned on a distance to one another, which extend substantially perpendicular with a height H in the same direction from the base plane of the wall element, each corner element defining an angle A of the chamber with an angle line which is substantially perpendicular to the base plane, strip sections each connecting two corner elements that define adjacent corners of the chamber to one another, the distance between the strip sections and the base plane being less than H, wherein the continuous circumferential bonding strip runs over the strip sections and over the corner elements and at least in the area of the corner elements at a distance from the base surface corresponding to height and wherein the outer contour of the film is shaped in such a way that the outer contour of the film corresponds to that of the circumferential bonding strip.

In such an assembly, a flexible film is connected to a circumferential bonding strip of the wall element. This circumferential bonding strip runs via strip sections located between the corner elements and across these corner elements. Because the distance of the corner elements from the base plane of the wall element is greater than the distance of the strip sections of the wall element from the base plane, the distance of the circumferential bonding strip from the base plane of the wall element varies depending on its location on the bonding strip. The film follows the bonding strip, which means that it does not run flat but extends in three dimensions.

As a result of the adhesion of the film to the bonding strip a chamber between the wall element and the film is formed. This chamber has a height at the corner elements that corresponds to the height H by which the respective corner element extends from the base plane of the wall element. The corner elements may differ in height, but the height should preferably be the same for all corner elements.

The film is hereto shaped in such a way that its outer contour corresponds to that of the circumferential bonding strip. As a result, the film can be folded at the circumference thereof to the contours of the bonding strip, without such a folding resulting in overlapping of the film. It is precisely because overlapping is avoided that a uniform bond is obtained over the entire bonding strip.

The wall element forms one side of the chamber, and the film the opposite side. The wall element may be designed as a partition component as described in EP3114045 defining two opposite chambers. Such a wall element then forms a common partition between these two chambers or is part thereof. It is also possible that the wall element comprises an annular structure with an open central section. In this case, the bonding strip will run across the annular structure and the chamber between the wall element and the film will be open on one side due to the open character of the wall element.

By the invention a chamber is formed, defined by the wall element and the film, which chamber is closed by bonding of the film to the circumferential bonding strip of the wall element. This closure is preferably in a sealing manner, so that liquids can also be accommodated in the chamber without leaking out of the chamber through the connection between the wall element and the film. To this end, the film is preferably sealingly connected to the wall element over the entire circumferential bonding strip. This can be achieved, for example, by providing the bonding strip with a continuous circumferential adhesive line or by using two-sided adhesive tape against which the film is pressed in order to create a seal between the wall element and the film. An interrupted adhesive line is also possible, but then the connection will usually not be closed, at least not for liquids.

The corner elements extend perpendicularly in the same direction from a base plane defined by the wall element, by which is meant that the corner elements extend from said base plane with a component perpendicular to said base plane, and thus extend at a distance from the base plane. As will be explained later, side walls of the corner elements may extend at any angle from the base plane, but preferably at an angle of 90° or more. The corner elements thus extend at an angle and in the same direction from the base plane with a height H measured perpendicular to the base plane. The corner elements thus form a kind of feet, enabling the wall element to rest on a surface. The corner elements can be spherical, i.e. with a single continuous wall or with several side walls, which side walls are preferably connected to each other and meet at an angle. One or more, and preferably all, of the corner elements have a truncated shape, whereby the truncated plane of the respective corner element defines a side of the corner element situated opposite the base plane. This truncated shape is preferably chosen when the corner elements have multiple side walls. In this form, the bonding strip runs over the truncated surface of the respective corner element via one or more side walls. The truncated surface of the respective corner element preferably runs parallel to the base plane B, and preferably the truncated surface of each corner element runs parallel to the base plane. Even more preferably, the truncated surfaces of the corner elements lie in a common plane, so that the height H is the same for each corner element. This ensures that the wall elements can rest evenly on the corner elements.

In an attractive embodiment, the strip sections extend substantially parallel to the base plan. The strip sections of the wall element are part of the circumferential bonding strip and are located between the corner elements. Although the distance of the strip sections to the base plane of the wall element may vary, they preferably run parallel to the base plane and, even more preferably, the strip sections run in the same plane as the base plane. In this case, the strip elements always extend over the base plane of the wall element.

In a special embodiment, a corner element, preferably all corner elements, has at least three side walls connected to one another, wherein the bonding strip runs over two of these side walls, which side walls are connected to one another by means of a third side wall. As already indicated, a corner element may consist of a single spherical wall, which may or may not be truncated. However, corner elements with at least three side walls are advantageous, wherein the bonding strip runs over two of these side walls and thus defines the angle of the chamber at this location. With three side walls, the corner element can, for example, have the shape of a truncated tetrahedron, with the bonding strip running over two walls and the truncated surface. The angle of the chamber with this corner element is then 120°. In a further attractive embodiment, a corner element, preferably all corner elements, is carried out as a truncated pyramid, wherein the bonding strip runs over the truncated plane and two adjacent side faces of the pyramid. The angle of the chamber is then 90°. The parts of the truncated pyramid over which the bonding strip does not run can be left out, reducing the truncated surface to a triangle. The bonding strip then rises from the direction of the wall element over one of the side surfaces of the corner element thus formed and runs over the truncated surface and then over the next side surface again towards the wall element, whereby the bonding strip describes an angle of 90°.

It is advantageous when the sidewalls of a corner element over which the bonding strip runs describe an angle F of 90° or more, preferably more than 90°, with the adjacent strip-shaped sections of the wall element. The angle line of angle F runs parallel to or coincides with the base plane. With such a construction, the rise of the bonding strip towards a truncated surface of a corner element is gradual and there a flexible film can be connected to the wall element by an attractive fold. The sharper the angle, the more the film has to be folded, which can cause difficult adhesion. However, angles of 90° or even sharper are also possible, but these are not preferred. An advantageous angle is between 160° and 110°, preferably between 120° and 150° and most preferably between 130° and 140°. The optimum angle is 135° because this will absorb the forces on the bond most advantageously and most evenly. When the wall element is manufactured by thermoforming, angles of 135° are also ideal for release.

It is very attractive when the wall element comprises four corner elements where the angle A of each wall element is a right angle. The angle line of angle A is perpendicular to the base plane. Although very advantageous, the corner elements do not have to have the same angle A each time. Therefore, in the case of four corner elements, angles Aa, Ab, Ac, Ad are referred to herein. The angles are preferably equal and right. Such a construction makes a rectangular or square chamber shape possible. Such shapes are advantageous when the assembly according to the invention comprises two chambers separated by the wall element, whereby the chamber formed by the assembly of the invention can form a collection chamber for liquid from the other chamber. As already described above, a right angle A can be obtained with a truncated pyramid shape or part thereof. Two or three corner elements are also possible, whereby in the case of two corner elements the chamber describes, for example, an elliptical shape, the corner points of which are opposite to each other and which corner points are connected to each other by curved strip sections. A room with three corner elements is also possible, whereby a triangle-shaped chamber is formed.

Preferably, the film at the location of bonding to a corner element is shaped in such a way that the sides of the film describe the angle A of the corresponding corner element and wherein the film, at the point of intersection of said two sides, is truncated in such a way that angle A is described by at least two distant angles α1 and α2. This configuration is illustrated in the figures below. If the corner elements are, for example, truncated pyramids or are reduced to their relevant parts, the film will describe an angle A of 90°. In order to ensure that the outer contours of the film correspond to the contours of the bonding strip without the film folding lines intersecting, the film is truncated at the point of intersection of angle A, forming two equal angles of 135°. When the film is connected to the wall element on the bonding strip, the middle of the line between angles α1 and α2 will be located at the vertex of the truncated surface of the corner element and after adhesion, the film will run from this point against both sidewalls towards the wall element. The film is preferably a rectangular film whereby the four angles A are each formed by two essentially equal angles α1 and α2 of 135°.

By choosing the shape of the corner elements and of the film as described above, the film can be attached to the bonding strip and connected to the wall element without stretching or without buckling or without both stretching and buckling. The film only needs to be folded without the film partially overlapping with itself or being hindered from following its intended shape. When the film is not stretched, it retains its thickness everywhere and this is of great advantage because the film does not lose its strength and barrier properties.

Preferably both the film and the wall element are made of a thermoplastic material, such as for example polyethylene, polylactic acid, polyhydroxylalkanoates, polypropylene, polyethylene terephthalate, polyvinyl chloride, polystyrene, polyvinylidene, polycarbonate, acrylonitrile butadiene styrene. The film and the wall element are preferably made of the same material in order to facilitate post-use processing and reuse.

In thermoformed plastic packaging, known in the art, the corners of plastic packaging are stretched during the thermoforming process, which reduces the thickness of the material locally. As the packaging must have a minimum thickness, this is determined by the thickness at the stretched corners, while the walls of the packaging are proportionally too thick. As the film itself, as described above, is not stretched but can run over stretched parts of the packaging, the packaging in question is strengthened precisely at the stretched parts by the adhesion of the film. As a result, the thickness of the thermoplastic material can usually be reduced by 30-100 μm and the thickness of the film material can be reduced to 250-400 μm, preferably to 300-350 μm. However, the wall thickness of the material of the assembly according to the invention is not limited to such a thickness. In cases where a greater wall thickness is required, such as in the manufacture of specific packaging forms for, for example, heavy contents, or in the application of specific, often softer materials such as, for example, polypropylene, such material savings can be achieved. Thus, according to the invention, it is possible to provide packaging for mussels, for example, with a wall thickness of up to 1.5 mm, and packaging made of polypropylene with a thickness of 500 μm to 2 mm or greater.

When both the wall element and the film are made of a thermoplastic material, the film can be bonded to the bonding strip of the wall element by fusion welding, thus creating a continuous seal between the film and the wall element. The bonding strip can have any width, but is preferably 3-10 mm, more preferably 4-5 mm wide.

In an attractive embodiment, the wall element is designed as a bottom element of a container with one or more side walls that extend in an essentially perpendicular direction from the bottom element of the chamber to form a space. In this space, a fresh produce can be kept, and any moisture from such fresh produce can be collected in the chamber defined by the assembly. A receptacle having a collecting chamber is known from EP3114045.

The bottom element is attractively provided as a partition element between the chamber and the space, which partition element includes at least one drain opening arranged to drain liquid from the space into the chamber, wherein the assembly is provided with a resistive element extending into the chamber surrounding the drain opening such that the resistive element prevents transport of liquid from the chamber into the space. Such a configuration, known from EP3114045 and further explained therein, causes moisture released in the space to flow into the chamber and prevents the moisture from flowing back into the space. In a particular embodiment, the resistive element is arranged such that the wall element, which is designed as a partition element, runs from the perimeter thereof towards the centre at an angle to the base plane towards the chamber, so that liquid from the space can flow into the chamber, but not back. The partition element forms a sort of funnel towards the centre of the chamber. Due to this configuration, the wall element provides a resistance element that prevents the backflow of the liquid from the space towards the chamber.

The invention also relates to the manufacture of an assembly as described above, and comprises the steps of:
  a. placing the film on the wall element on the side of the bonding strip thereof, whereby the film is brought in contact with the wall element at least locally,
  b. bonding of the film to the wall element at the location of contact in step a,
  c. bonding of the film to the wall element over its entire bonding strip.

Placing the film on the wall element on the side of the bonding strip thereof, can be done by placing the wall element with the corner elements facing upwards and fixing the film on the wall element from above, or the wall element against the film. The reverse is also possible, whereby the wall element is placed with the corner elements facing downwards and the film is applied to the wall element from below. When the wall element comprises or is made of thin-walled material, such as thin-walled thermoplastic material, the wall element is preferably supported by a support element that preferably follows the contour of the wall element at the point of the bonding strip and thereby supports the wall element at the location of the bonding strip. Even more preferably, the support element supports the wall element over a significant portion of the wall surface to also fix the wall element before the film is placed on the wall component. In step a., the film is at least locally brought into contact with the wall element. This contact may take place on one or more sections of the bonding strip of the wall element, such as on the truncated sides of the corner elements. The film is then first bonded to the wall element at the truncated surfaces of the corner elements in step b., for example by fusion welding or by applying a suitable adhesive to the truncated surfaces of the corner elements, after which the film is bonded to the wall element in a later step c., if desired, over the entire bonding strip. It is also possible to join the film to the wall element over the entire bonding strip in a single step in which steps a. and b. are combined. For this purpose, the film is preferably pressed from above in the area of the bonding strip by a pressing element which essentially follows the contours of the bonding strip. When the connection is made by fusion welding, the pressure element where it presses the film against the bonding strip should preferably be heatable. When a pressure element is used, the support element is preferably springy or cushioned in order to give way when the film is pressed onto the wall element by the pressure element.

The method according to the invention is particularly attractive when the wall element is provided with side walls as described above wherein it defines a space in which, for example, fresh produce or meat can be stored and wherein the chamber is arranged to collect the moisture released in the room without allowing it to flow back into the space. For this purpose, the wall element is preferably provided with one or more drainage openings and one or more resistance elements that prevent this flowing back through the openings. The resistance element is then, as already explained above, preferably designed in such a way that the wall element designed as a partition element runs from the periphery thereof towards the centre at an angle to the base surface towards the chamber, so that liquid from the space can flow into the room, but not back. The partition element then forms a funnel, as it were, towards the centre of the room. Due to this configuration, the wall element provides a resistance element that prevents the backflow of the liquid from the chamber towards the room. In a particular embodiment of the method, such a wall element is placed in step a., and preferably the method prior to step b. includes providing one or more openings in the partition element, for example by punching the wall element at intended locations prior to or after placement, preferably near or around the centre of the wall element.

In a special embodiment, the wall element includes one or more connecting elements extending within the chamber perpendicularly from the base plane of the wall element to a distance substantially corresponding to the distance by which one or more corner elements extend from the base plane of the wall element, and in step b. the film is brought into contact with said one or more connecting elements and in step c. is connected to the one or more connecting elements. Due to the presence of such connection elements, the film may be connected to said connection elements in step b. in order to fix the film and to subsequently or simultaneously connect the film to the wall element at the bonding strip. The wall element can, for example, contain a connecting element in the middle that extends as far from the base plane as the corner elements. This keeps the film in one plane and also prevents the chamber from sagging undesirably when filled with liquid.

The invention also relates to a device for the manufacture of an assembly according to the invention. To this end, the device is characterised by comprising:
  a. a support member designed to support the wall element on the side facing away from the corner elements;
  b. a pushing member arranged to bring the film into at least local contact with the wall element, the pushing member being movable towards the support member or vice versa, both the support member and the pushing member follow the contours of the wall element at least locally, which contours extend in three dimensions.

With such a device, an assembly according to the invention can be manufactured whereby the support element supports the wall element and the pressure element presses the film onto the wall element. To this end, the device preferably also comprises positioning means for positioning the film relative to the wall element. Since the contours of the wall element extend in three dimensions, the support element and the pressure element also follow these contours. These contours are preferably formed by the bonding strip. Thus, the pressure element and the support element preferably follow the contours of the bonding strip or one or more portions thereof. The device may also comprise a film feeding element by which the film is provided. The film feeding element may hold a roll of film or sheets of film and this film may be cut to the correct shape and size prior to positioning relative to the wall element, in particular the film is cut such that its outer contour follows the contour of the bonding strip of the wall element. It is also possible for the film to be cut into the correct shape by the feed element or the pressure element.

The pressure element may be heatable at one or more locations, in such a way that the one or more heatable locations of the wall element correspond to the location on the wall element where the film is connected to the wall element. This design is particularly important when both the film and the wall element are of thermoplastic material. The pushing member can thus provide a fusion weld to bond the film to the wall element. This heat can also be used to cut the film in the correct outline shape in the bonding step.

For optimal adhesion, in a particular embodiment of the device according to the invention, the support element follows the contours of the bonding strip. For the same reasons, the support element preferably follows the contours of the wall element.

Preferably, the device also includes punching means for making one or more openings in the wall element, preferably near the centre.

The device described above may be arranged to receive already formed wall elements, which wall elements are manufactured by, for example, thermoforming or injection moulding. It is also possible to integrate or combine the device according to the invention with a device for thermoforming or injection moulding the wall element.

The assembly according to the invention is further explained in the accompanying drawings.

FIG. 1A shows a schematic view of a wall element that is part of a container for fresh produce. FIG. 1B shows the same wall element with the bonding strip indicated. FIG. 1C shows a film, FIG. 1D the wall element of FIG. 1A above which the film of FIG. 1C is positioned, FIG. 1E shows the film of FIG. 1C in the shape it gets after bonding with the wall element of FIG. 1A and FIG. 1F shows the wall element of FIG. 1A to which the film of FIG. 1C is bonded. FIG. 1G shows a cross section of FIG. 1F through the plane XY.

FIGS. 2-5 show additional embodiments of the assembly of the invention in which the configuration of the spacer elements each differ from that of the embodiment according to FIG. 1. Top views of the respective embodiments are shown in FIGS. 2A-5A, the respective shapes of the corresponding films in FIGS. 2B-5B, a view at the location of the respective corner element in FIGS. 2C-5C and a full perspective view in FIGS. 2D-5D.

FIGS. 6 and 7 show two embodiments of the invention wherein two chambers are formed. FIGS. 6A-7A show a top view of the wall element, FIGS. 6B-7B of the corresponding film, FIGS. 6C-7C of the assembly in which the film of FIGS. 6B,7B is attached to the wall element of FIGS. 6A, 7A respectively. FIGS. 6D,7D are a side view of the wall element of FIGS. 6A, 7A and FIGS. 6E, 7E of the assembly of FIGS. 6C, 7C. FIGS. 6F-6H show an alternative embodiment with two chambers in, respectively, a side view of the bottom, a side view of the inside, a front view of the inside and a side view of the long side of an assembly according to the invention, using for the same elements the same reference numerals as for FIGS. 6A-E.

FIG. 8 shows a support element and a pressure element for manufacturing the assembly. In FIG. 8A a wall element according to FIG. 1A is located between the support element and the pressure element, in FIG. 8B also a film according to FIG. 1C and in FIG. 8C a finished assembly according to FIG. 1.

FIG. 1A shows a wall element 2 which, in the case shown, is part of a receptacle 8 with four side walls 8a, 8b, 8c, 8d of which, in the perspective shown, side walls 8a and 8b are visible. Such a receptacle is suitable for packaging, for example, meat and has dimensions of 18 cm×14 cm×5 cm. However, size and shape can be varied. In the case shown, said side walls include at their free end a circumferential flange 100. The wall element 2 comprises four spaced out corner elements 6a, 6b, 6c, 6d, each of which extends perpendicularly in the same direction from the base plane B of the wall element. This plane is shown in FIG. 2. The corner elements 6a, 6b, 6c, 6d each define a right angle of the chamber to be formed, which chamber is indicated in FIG. 3 by the reference number 5. Each corner element 6a, 6b, 6c, 6d is connected via strip sections 7a, 7b, 7c, 7d to two corner elements which define the adjacent corners. Thus, corner element 6b is connected to corner element 6a via strip section 7a and to corner element 7d via strip section 7d. In the case shown, the strip sections coincide with base plane B. The distance between the strips and the base plane is therefore 0. The corner elements are derived from a truncated pyramid with a truncated surface 6b5, 6c5 which is essentially parallel to base plane B. One half of the truncated pyramid, defined by the vertical diagonal plane that runs through two vertices of the pyramid, is missing and is replaced by a straight wall 6c4 that coincides with the diagonal plane. Similarly, the angle opposite the said diagonal plane is truncated, forming an inclined corner plane 6b3. Thus corner element 6b has two side walls 6b1 and 6b2.

Wall element 2 has four spacers 12a, 12b, 12c, 12d that extend mainly as far from the base plane B as the corner elements 6a, 6b, 6c, 6d. These spacers 12a, 12b, 12c, 12d serve as spacers for the film to be placed and to fix the film during the production process.

FIG. 1B shows wall element 2 of FIG. 2 in which bonding strip 3 of the wall element is shown as a solid circumferential band. The bonding strip runs over the strip sections 7a, 7b, 7c, 7d and over the truncated sides 6a5, 6b5, 6c5, 6d5 of the corner elements 6a, 6b, 6c, 6d, as well as over two side walls 6b1, 6b2 of each corner element. The bonding strip has a width of, for example, 4-5 mm, particularly when the receptacle has the dimensions shown in FIG. 1A. Sidewalls 6b1 and 6b2 are connected to each other through sidewall 6b4. This sidewall is not visible for perspective reasons but corresponds to sidewall 6c4 of corner element 6c. The wall element is implemented in the case shown as a partition element between the chamber, shown in FIG. 1G, and space 9 defined by side walls 8a, 8b, 8c, 8d. This space can serve to accommodate, for example, fresh products which may release moisture during storage, such as fresh fruit or meat. The space may then be closed, for example, with a plastic film by attaching the film to the circumferential flange 100. The liquid lost from the fresh products can then escape from the space towards the room via drainage openings arranged around a central spacer 12e in the wall element 2. The wall element runs from its perimeter towards the centre at spacer 12e at an angle to the base plane B towards the chamber 5, so that liquid can flow from the space into the chamber, but not back. As a result of this configuration, the wall element provides a resistive element 11 that prevents backflow of the liquid from the chamber 5 towards the space 9. A resistance element may also be implemented, for example, as an upstanding edge of the openings 10, which upstanding edge extends from the opening towards the chamber 5. Alternative embodiments of resistance elements are described in EP3114045. The wall element includes elongated recesses 13 which ensure that any liquid dispensed in the chamber 9 flows in an accelerated and controlled manner towards the openings 10 surrounding spacer 12e.

Figure 1A:
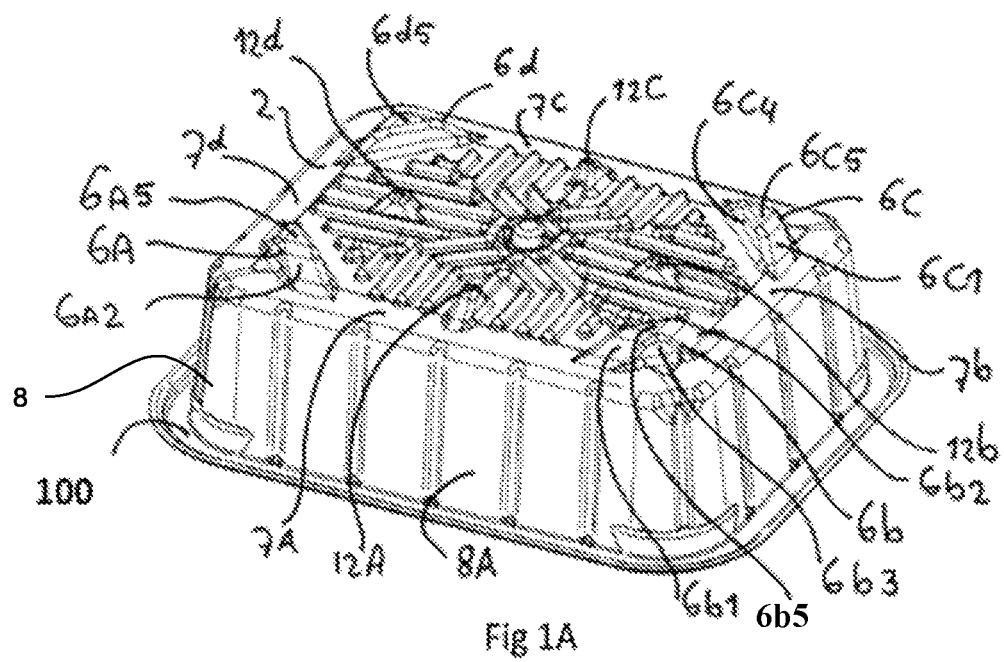
FIG. 1C shows a flat film 4, the outer contour of which corresponds to that of the bonding strip 3 of FIG. 1B.
FIG. 1D shows the flat film 4 of FIG. 1C positioned above the wall element 2 of FIG. 1A.
FIG. 1E shows the film 4 of FIG. 1C in the form it takes after bonding to the bonding strip 3. The film follows the contours of the bonding strip.
Figure 1B:
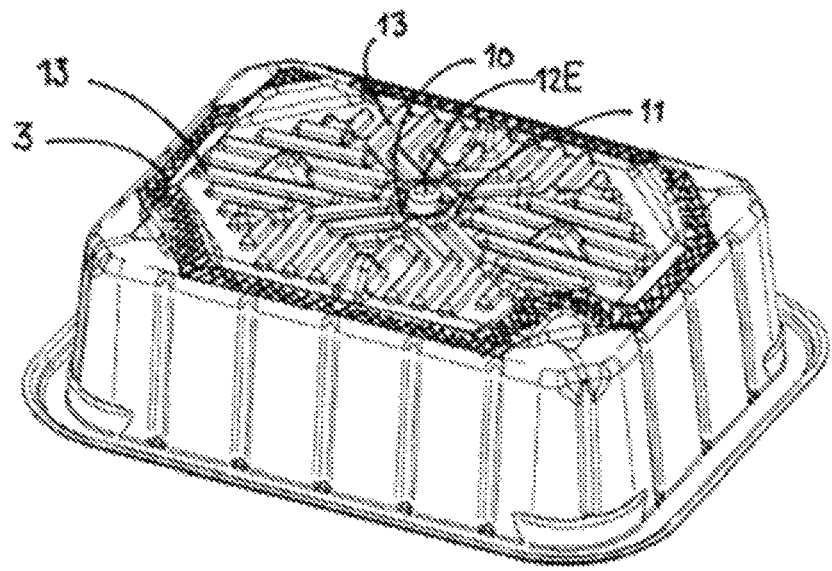
Figure 1C:
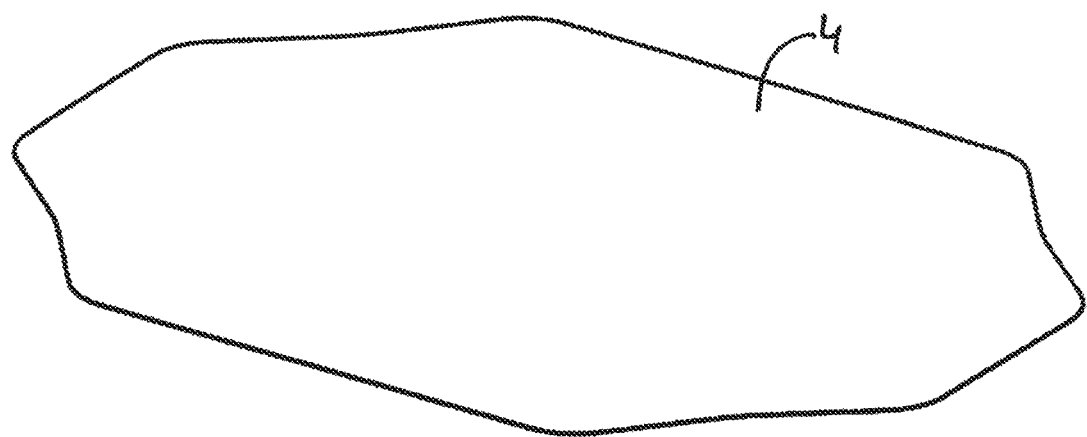
Figure 1D:
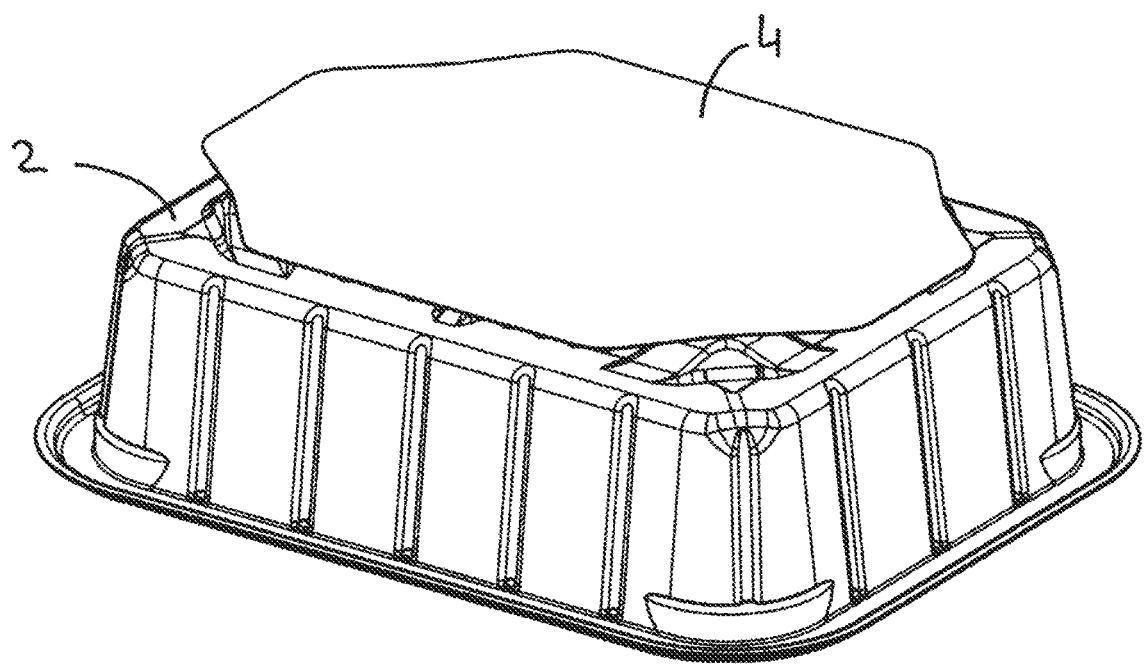
Figure 1E:
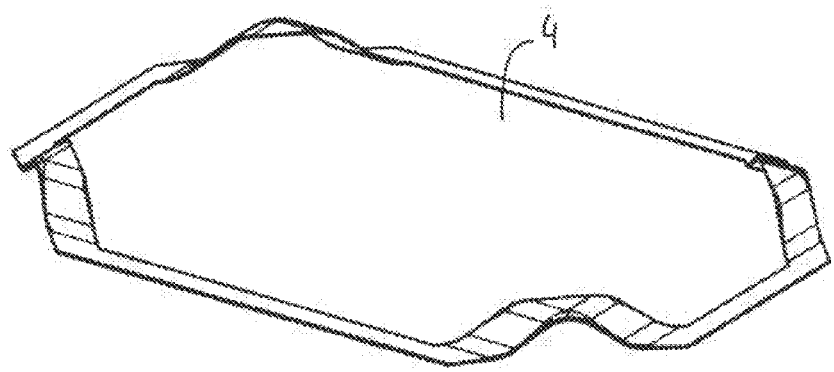
Figure 1F:
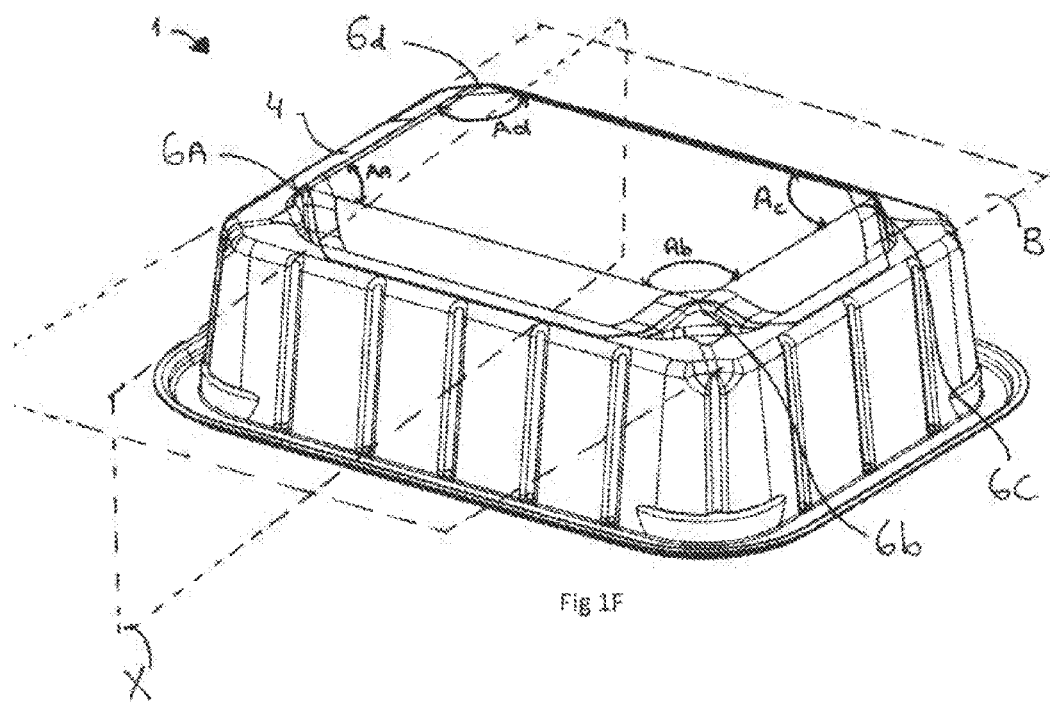

FIG. 1F shows the wall element and film of FIGS. 1A-E, where a flat film 4 is connected to the wall element 2 via the bonding strip 3 to form chamber 5. The base plane is represented by B. The angles A (Aa, Ab, Ac, Ad) defined by the corner elements are equal and straight in the case shown. It is also possible to envisage, for example, a triangular or pentagonal chamber where the corner elements describe an angle A of 120° or 72° respectively. Other shapes are also possible, such as an L shape.

Figure 1G:
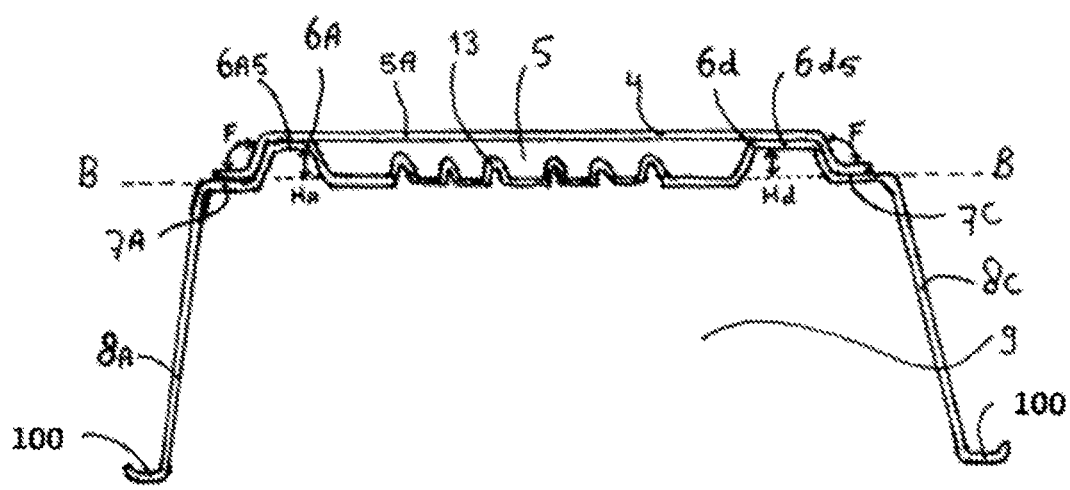

FIG. 1G shows a cross-section of the assembly 1 shown in FIG. 1F through plane X. The same reference figures as in FIGS. 1A-F are used for the same cases. Corner elements 6a and 6b extend in the same direction perpendicular to the base plane B with a height of Ha and Hb respectively, which is the same in the case shown. Film 4 forms wall 5a of chamber 5 and is connected to wall element 2 at the location of the truncated sides of corner elements 6a5 and 6d5, and at side walls 6a2 and 6d1 of corner elements 6a and 6d respectively. The film is bent outward at the base of the corner elements, i.e. at the level of plane B, and connected to strip sections 7a and 7c that extend into the base plane B between corner elements 6a and 6b, and 6c and 6d, respectively. Wall element 2 forms room wall 2a that extends essentially parallel to the room wall 5a formed by film 4. The side walls 6a2, 6d1 of the corner elements 6a, 6d describe an angle F of approximately 120° with the adjacent strip sections 7a and 7c.

Figure 2:
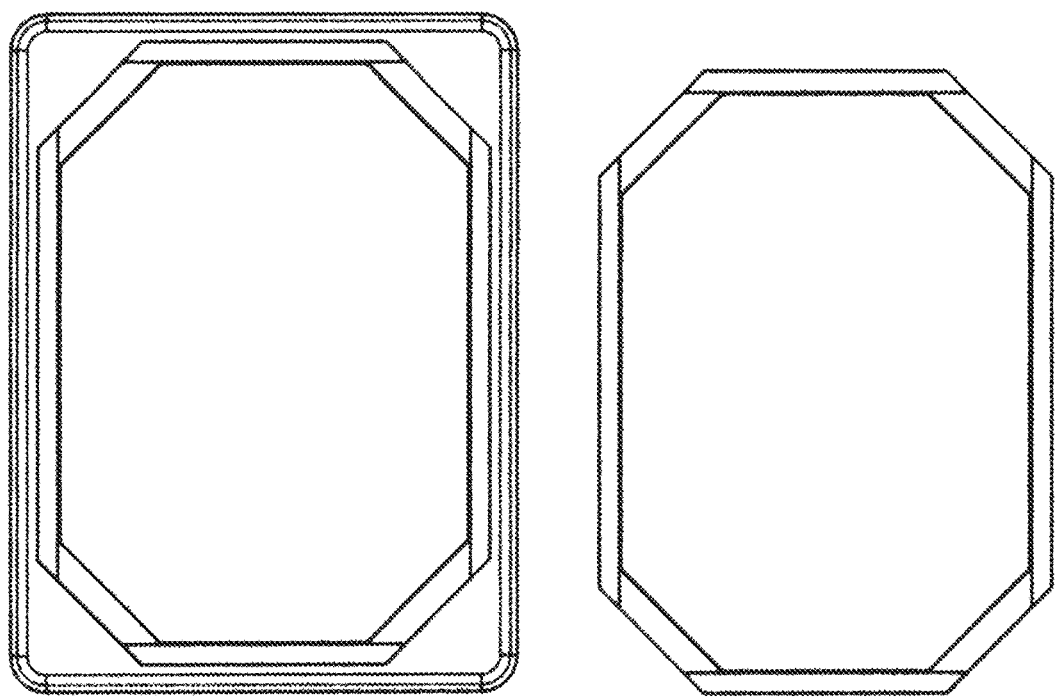
Figure 2:
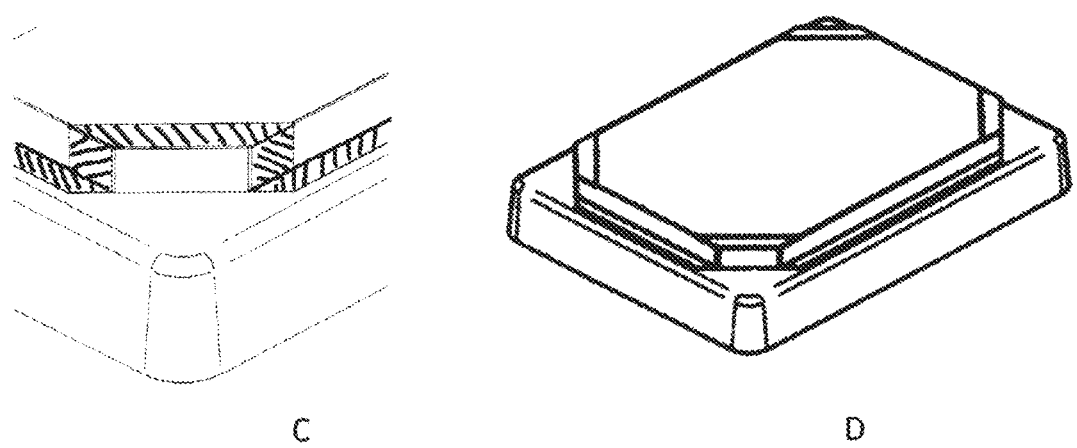
Figure 3:
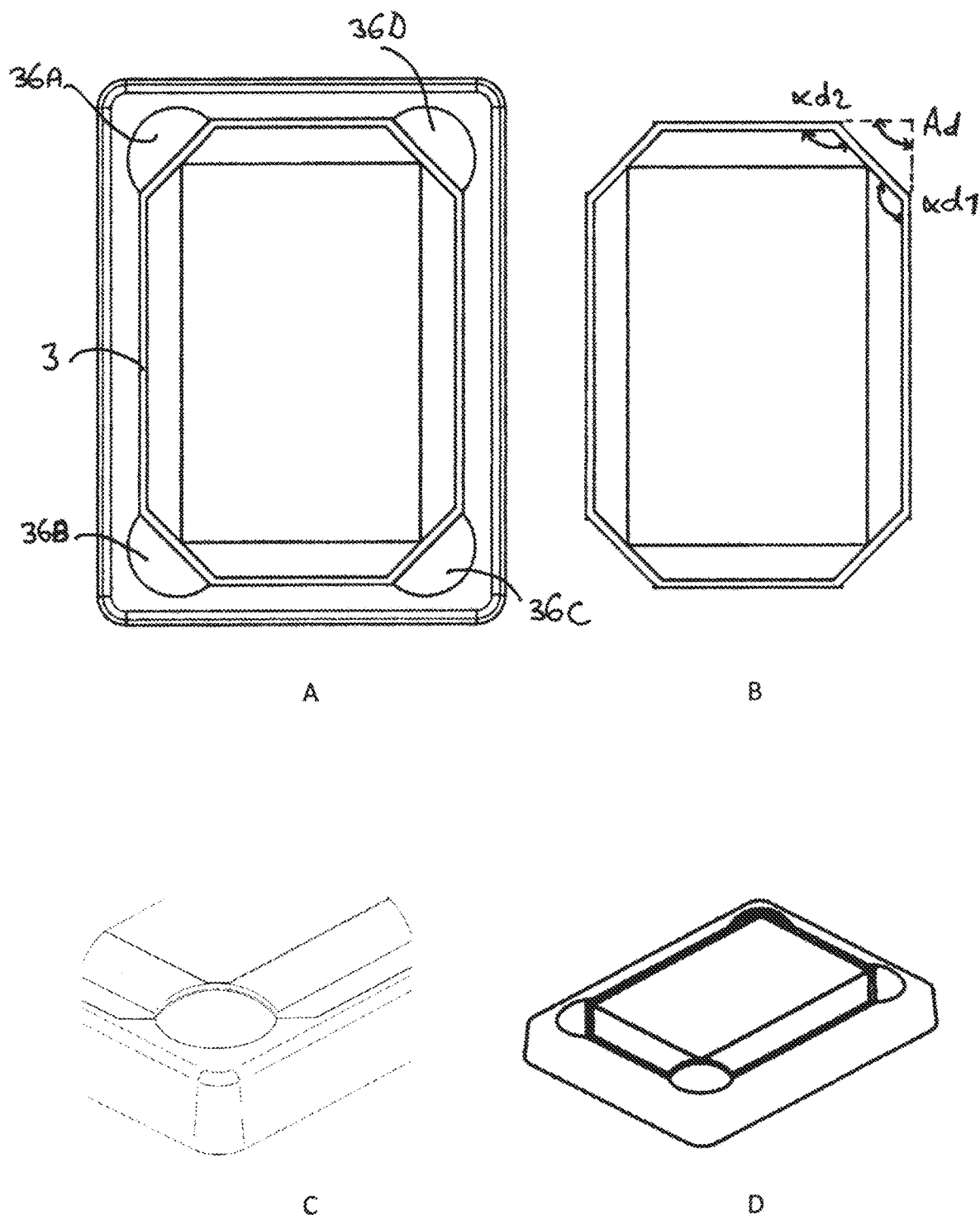

FIGS. 2A-D show the assembly of FIGS. 1-3 schematically. It is clear that the film is connected to the wall element without stretching or buckling. In FIG. 2C the shaded area shows the edge of the film 4 attached to the bonding strip 3.

FIGS. 3A-D show an assembly as of FIG. 1, where the corner elements 36A-D are spherical and thus have only one wall. The angles A of the chamber are 90°. The applied film is shown in FIG. 3B, whereby the angles A are truncated at the intersection of two opposing sides in such a way that angle A is described by two distant angles α1 and α2, which are both equal and 135° in the case shown. FIG. 3C shows that, with this configuration, the film can be connected to the wall element without stretching or buckling. In this case, the strip sections also coincide with the base plane B. It is also possible that the spherical shape is truncated within the chamber, so that the chamber is bounded at the corner element by a wall extending mainly at right angles from the base plane B to the top of the corner element. Thus, the spherical shape does not extend into the chamber and, in that case, has two walls, the convex wall outside the chamber and the straight wall delimiting the chamber.

Figure 4:
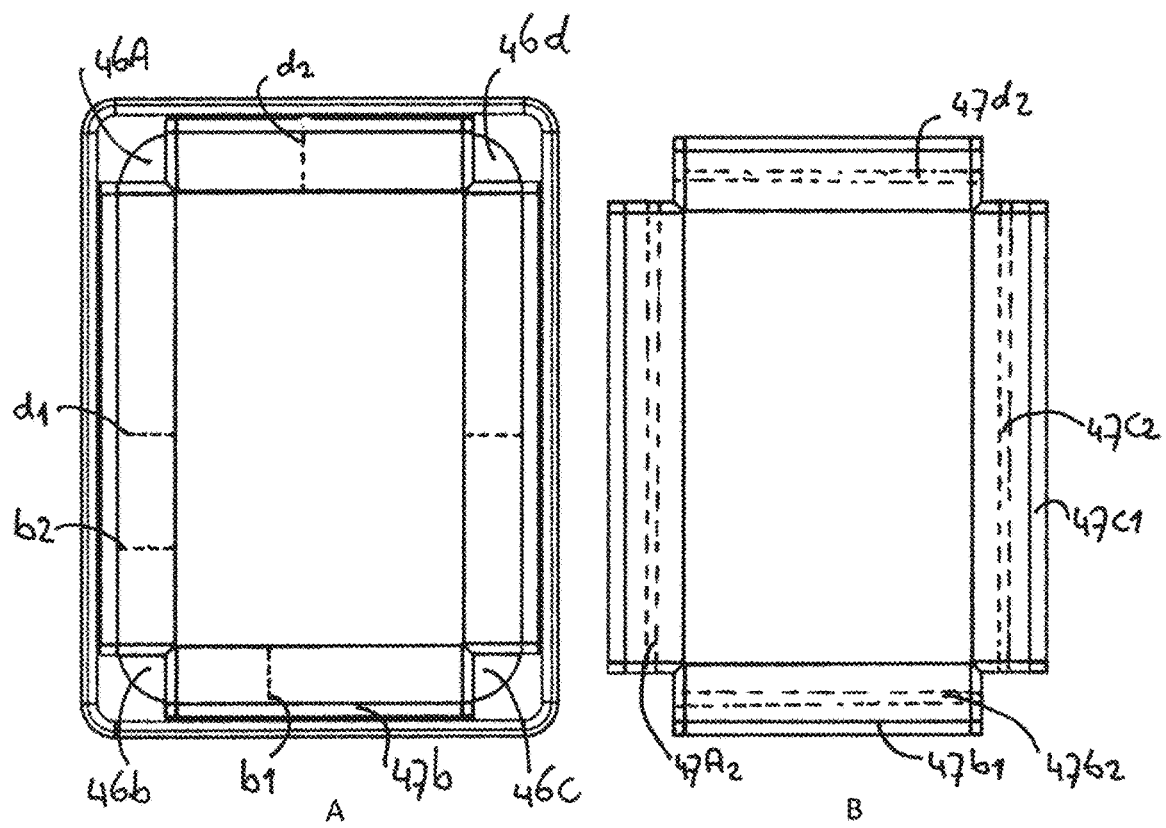
Figure 4:
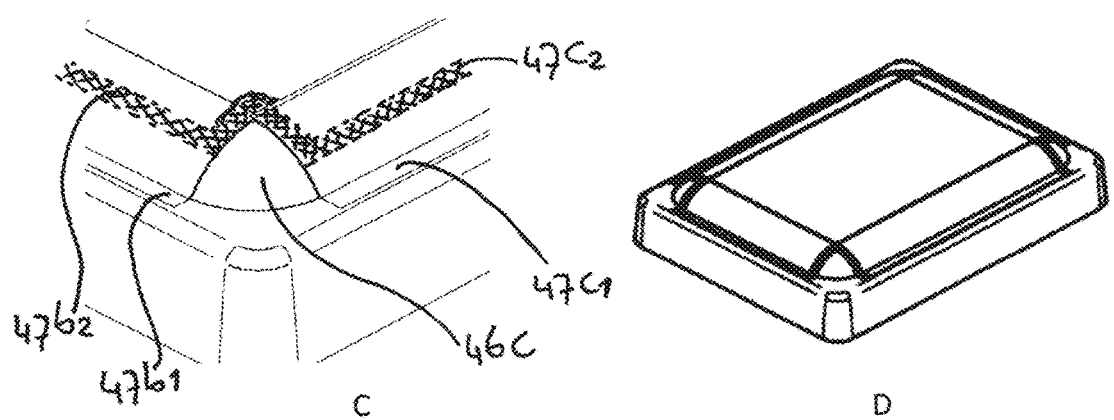

FIGS. 4A-D show an assembly in which corner elements are L-shaped with a quarter-round outer edge. The legs of the corner elements may extend for a relatively short distance parallel to the base plane as shown by dotted lines b1 and b2 for corner element 46B. It is also possible for the legs of an corner element to extend halfway to an adjacent corner element, so that the legs of the corner elements merge into each other. This is the case for corner elements 46a and 46d in FIG. 4A, where the legs of these corner elements extend halfway to the distance to the next corner element, shown by dotted lines a1, a2 and d1. The legs between corner elements 46a and 46d merge into each other. In such a configuration, the corner elements form a circumferential elevation, over which the bonding strip runs. The strip sections 47B and 47C of bonding strip 47 may coincide with base plane B as shown in FIG. 4C, and are shown in FIGS. 4B and 4C as 47B1 and 47C1, but they may also extend over the legs of the corner elements with a distance from the base plane which is less than the distance by which the corner elements extend from the base plane. Such an bonding strip is shown in FIGS. 4B and 4C as a double dotted line and designated 47b2 and 47c2. When the configuration is chosen in which the bonding strip runs over the quarter round legs of the corner elements, the film has the dimensions defined in FIG. 4b by strip sections 47a2, 47b2, 47c2 and 47d2. Again, the film is connected to the wall element without stretching or buckling.

Figure 5:
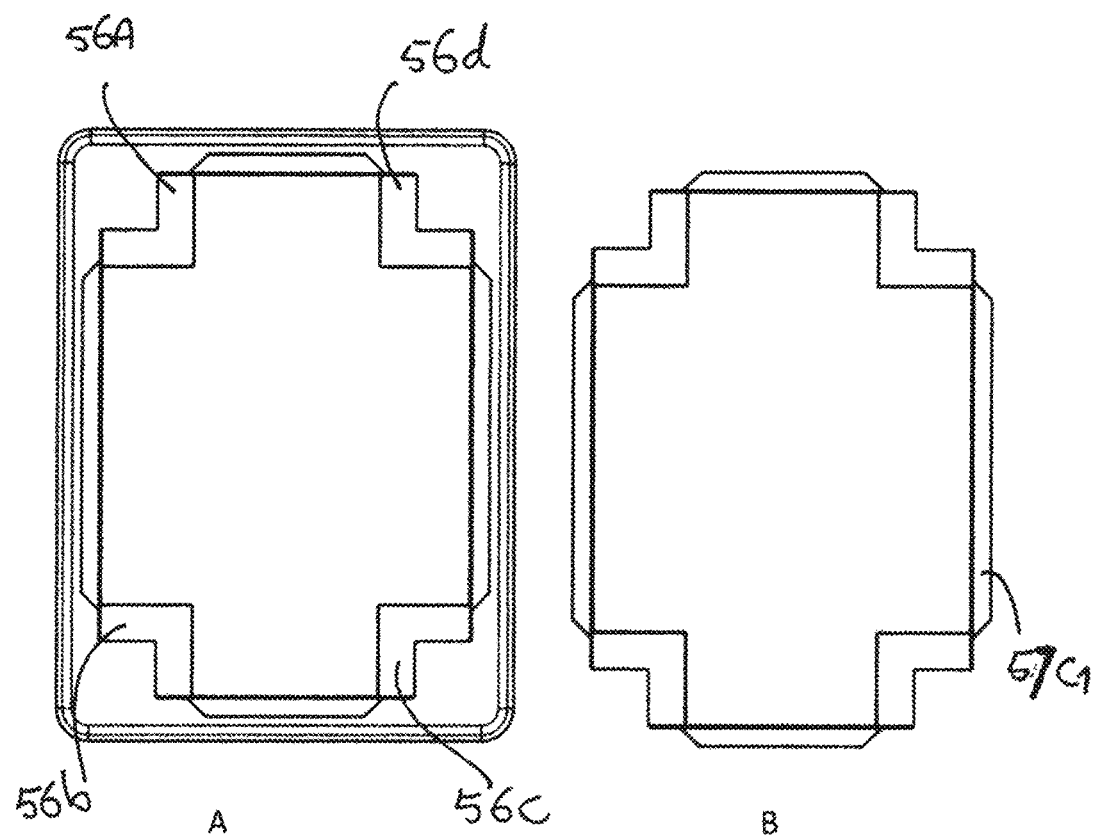

FIG. 5 shows an assembly wherein the corner elements are also L-shaped, but wherein the legs are directed away from the chamber. The film has corresponding L-shaped corners so that the edge of the film coincides with the bonding strip which runs over the L-shaped top surface 56c5 of the corner elements. The side walls over which the bonding strip runs describe in this case 90° with the adjoining strip sections which coincide with the base plane. Here, too, the film is connected to the wall element without stretching or buckling.

FIG. 6 shows an embodiment wherein wall element 62 defines two rooms 651 and 652, each with four corner elements 661a-d and 662a-d respectively. Film 64, shown in the top view of FIG. 6B has in the location of line 1-1 two spaced parallel folds, the distance corresponding to the height of the spacer elements 662a and 662d. As these folds are situated below each other, only the upper fold is visible in FIG. 6B. At the location of line 2-2, there are also two parallel folds at the same distance from each other, corresponding to distance elements 661b and 661c. Due to this configuration, the film forms a separating element 613 which separates the two chambers 651 and 652. Also in this embodiment, the film is connected to the wall element without stretching or buckling.

Figure 6F:
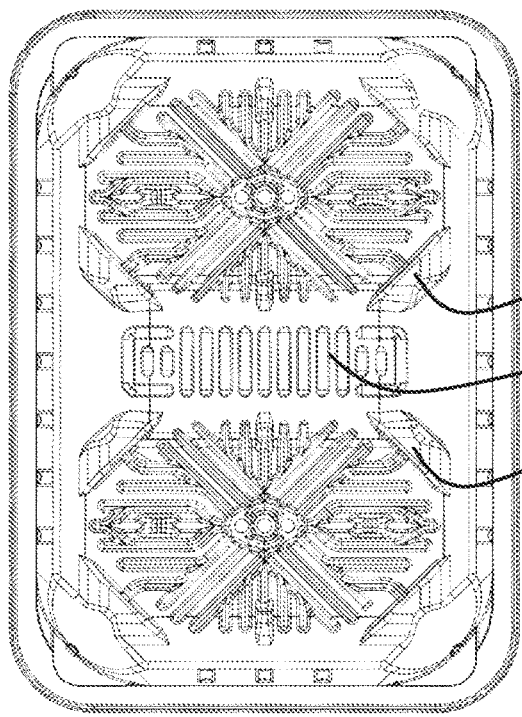
Figure 6G:
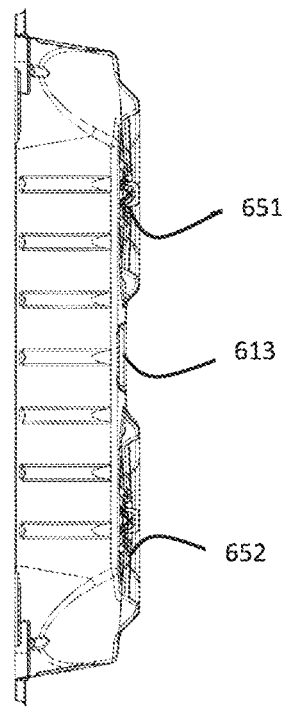
Figure 6H:
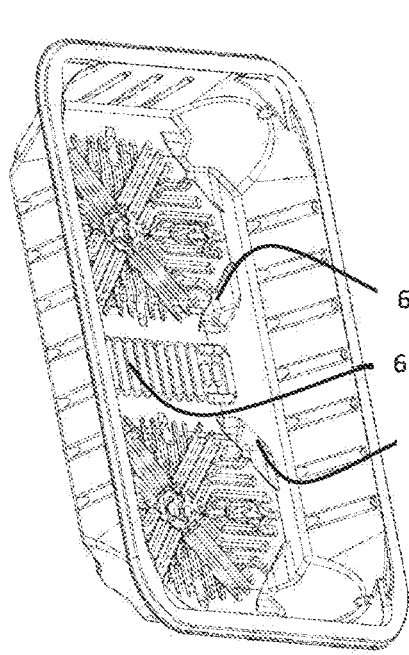
Figure 6I:
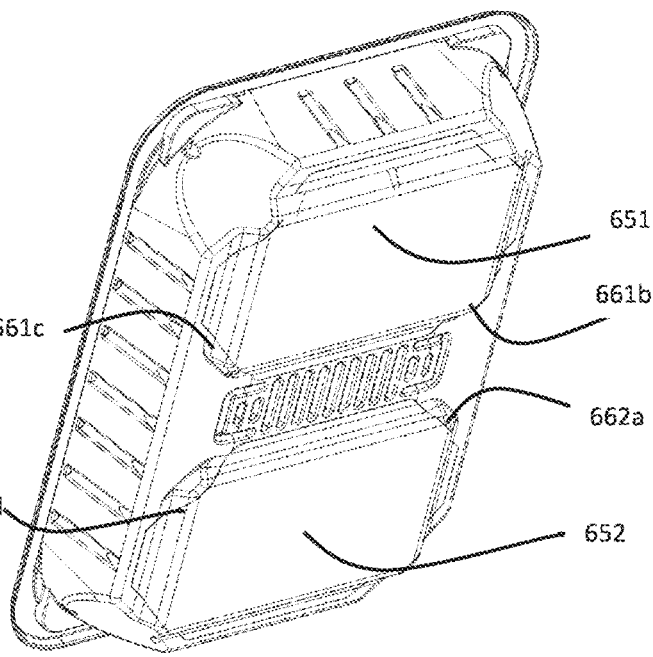

Between corner elements 661b, 661c, 662a and 661d there may be a separation element 613 extending from the base with a height equal to or less than that of corner elements 661b, 661c, 662a and 661d. This is shown in FIGS. 6F, G, H and I. This separation member 613 is capable of separating chambers 651 and 652 liquid-tight from each other. However, in the illustrated case, separation member 613 is provided with multiple regularly spaced channels 614 to allow liquid exchange between the chambers. The separation member extends with a lower height in relation to the base plane B than the corner elements which have the same height. However, corner elements 661b, 661c, 662a and 662d may also extend with lower height from the plane B than the corner elements 661a, 661b, 662b and 662c, so that the latter corner elements retain their support function, the height of corner elements 661b, 661c, 662a and 662d preferably being equal to that of the separation member 613. The strip sections connecting two corner elements of two separate chambers, such as between corner elements 661c and 662d and between 661b and 662a, may be located at a distance from or coincide with the base plane (B in FIGS. 1F and 1G).

Figure 7:
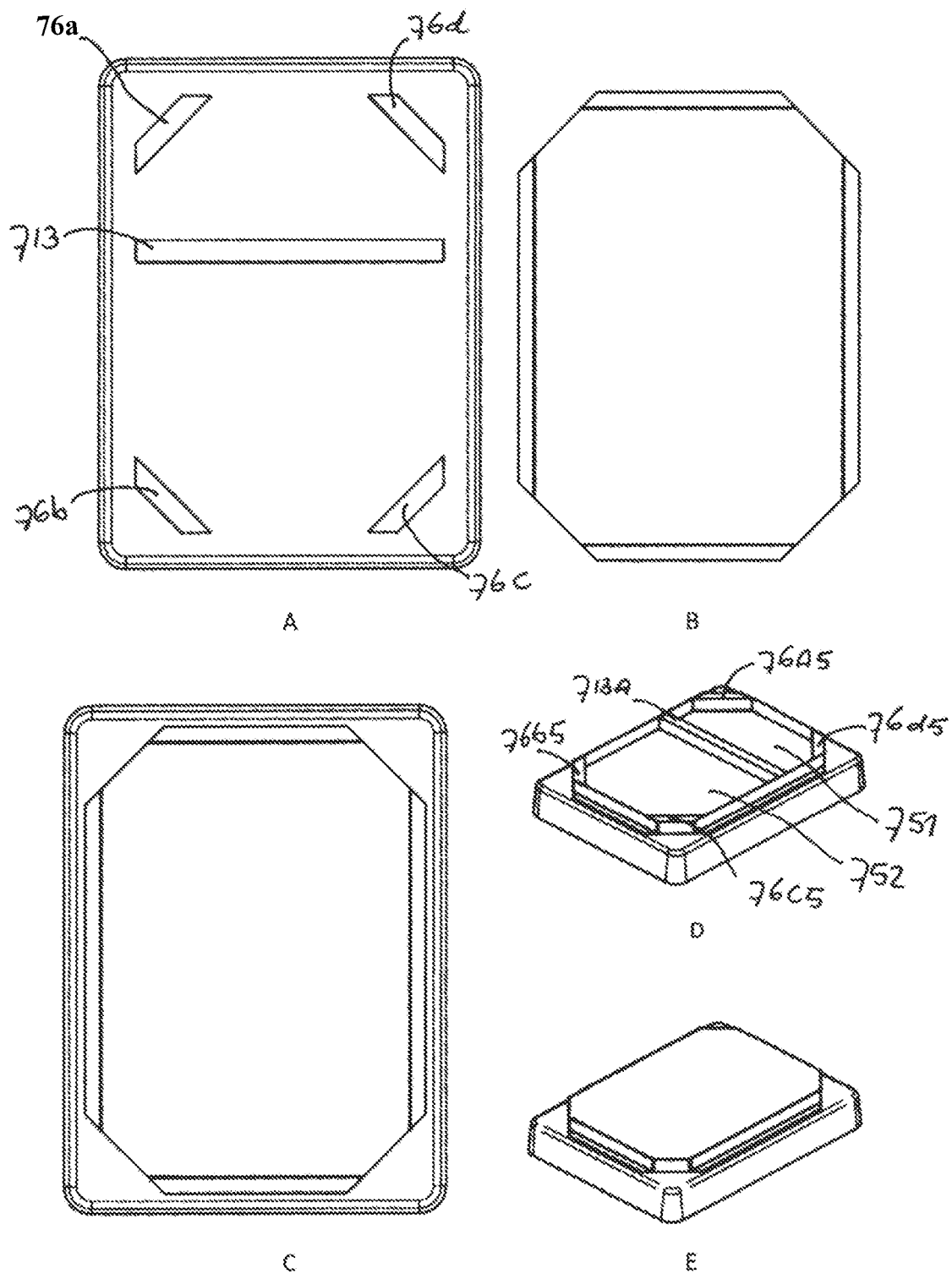

FIG. 7 shows an embodiment where a wall element as shown in FIG. 2 contains an additional separating member 713, which extends from base plane B with the same height as corner elements 76a-d. The corner elements are therefore the same height as the wall element. The film 47 extends over the truncated sides of the corner elements 76a5, 76b5, 76c5 and 76d5, as well as over the side 713a of the separating member 713 that is turned away from the wall element. This creates two chambers 751 and 752. The ends of the partition element 713 have an angle of 90° with the base plane B in the case shown, but this angle may advantageously be greater, as explained above for angle F of the side walls of the corner elements. The angle of the end of the base element preferably corresponds to angle F of the corner elements. The separation member may also have liquid passages so that there is an open liquid connection between the chambers.

Figure 8A:
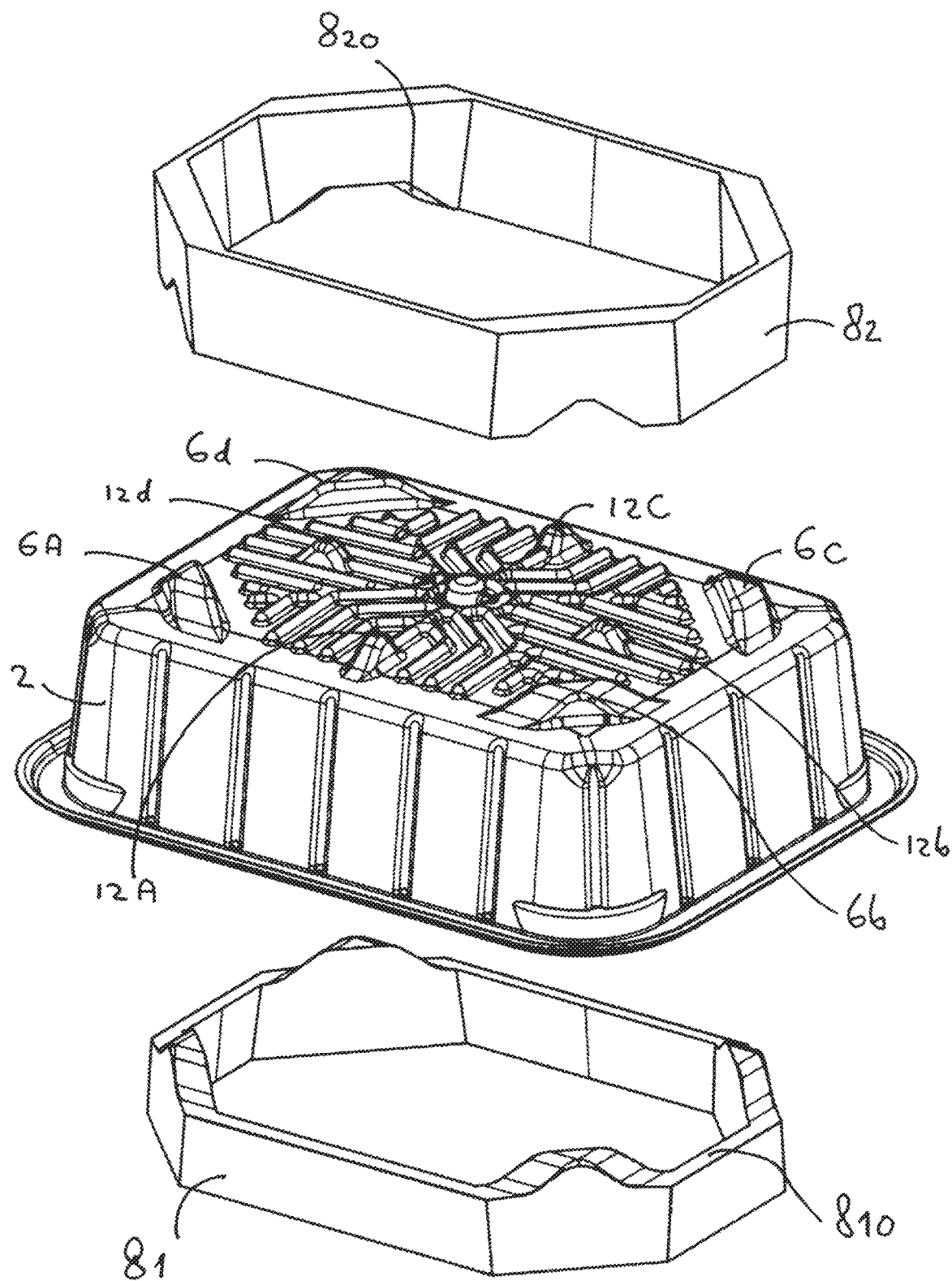

FIG. 8A shows the wall element of FIG. 1 as a receptacle, with the corner elements 6a-d and connecting elements 12a-d facing upwards, as well as a support member 81 shown below the holder. This support member 81 has a top side 810 which supports the bottom side of the wall element 2, i.e. the side of the wall element facing away from the corner elements in the area of the bonding strip 3. To this end, top side 810 follows the contour of the bonding strip 3 as shown in FIG. 1B at its lower end.

Above the wall element, a pushing member 82 is shown with a rounded lower side 820, which lower side 820 follows the contours of the bonding strip 3.

Figure 8B:
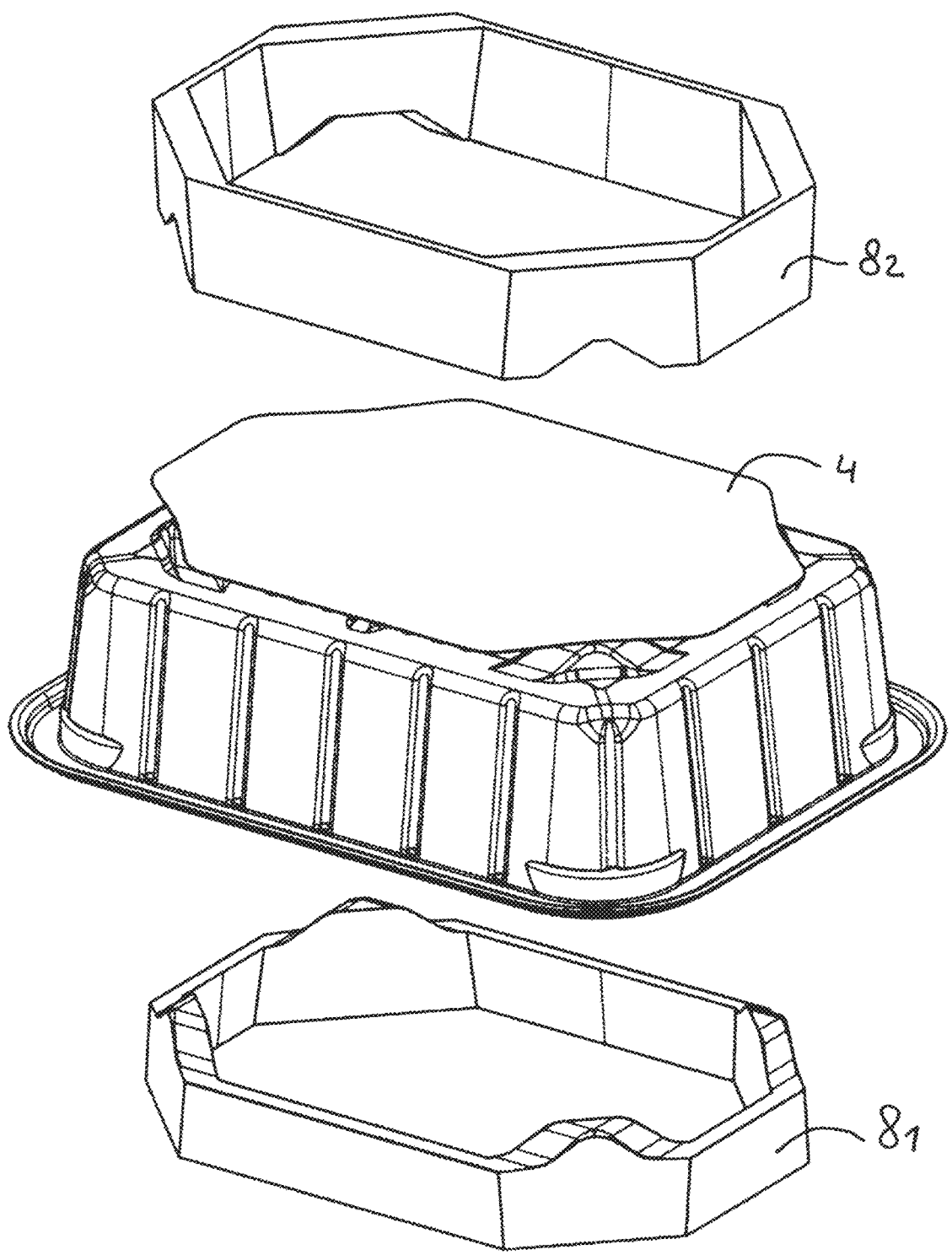
Figure 8C:
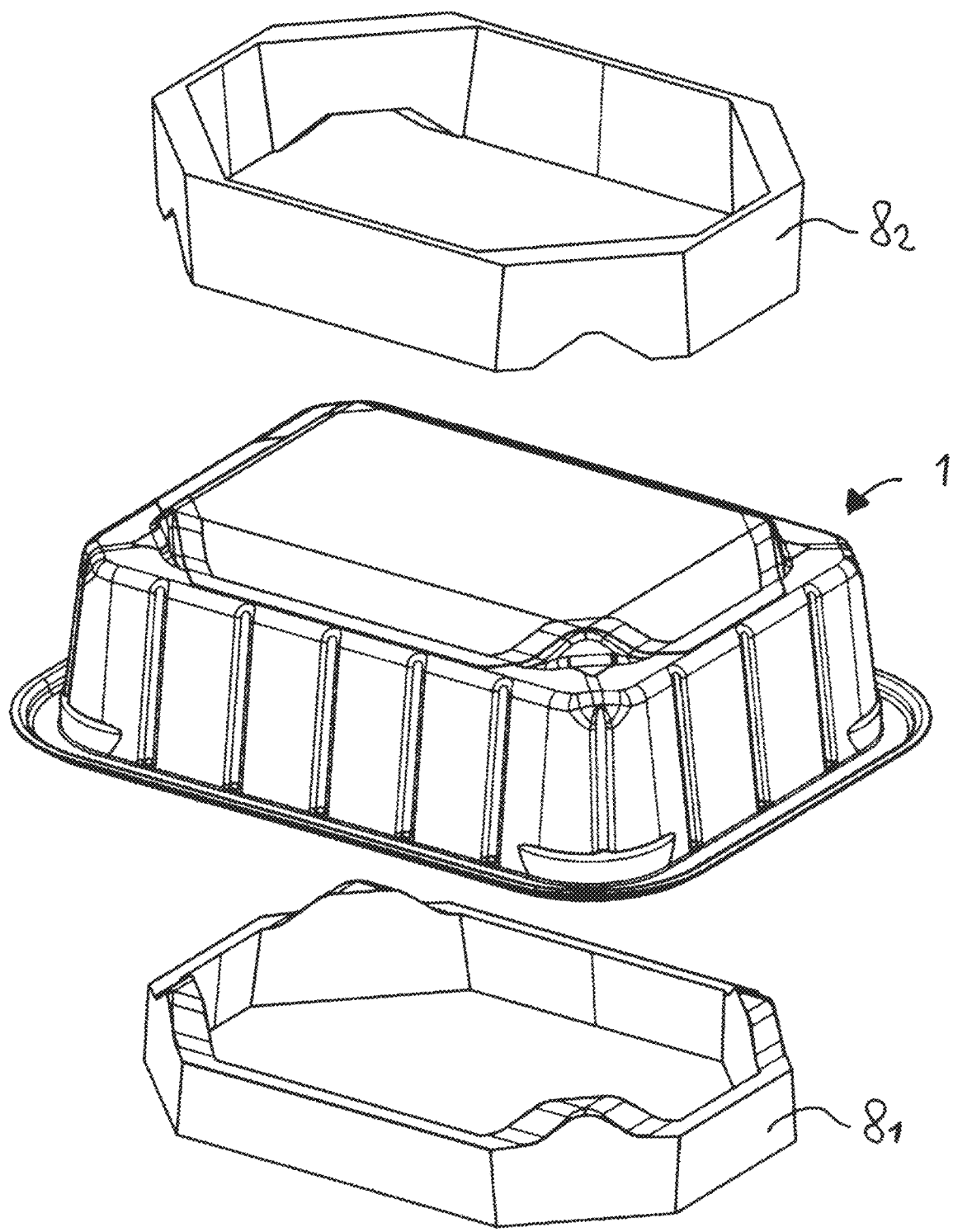

In FIG. 8B a film 4 is placed above the wall element 2. The outer circumference of the film 4 corresponds to that of the bonding strip 3 as shown in FIG. 1B.

The film is attached to the wall element by placing the wall element 2 on support member 81, supporting the bonding strip 3 of the wall element 81. Subsequently, the pushing member 82 is held against the wall element so that the film is pushed against the bonding strip at its outer circumference and is connected to it. This can take place by heating the underside 820 of the pushing member 82 so that a heat weld is formed between the wall element and the film, which heat weld can be either sealing or interrupted, as desired. With a sealing heat weld, a closed chamber is formed. Bonding can also be achieved by applying an adhesive to the bonding strip 3 before pressing film 4 against the wall element 2. Openings in the chamber may nevertheless be created by inserting openings in the wall element as shown in FIG. 1B. In the case shown, the film 4 is already fitted, i.e. its outer circumference corresponds to that of the bonding strip 3, but it is also possible that the film is not fitted until after the film has been bonded to the wall element, or during the bonding process. For example, the outer circumference of the bottom edge 820 of the pushing member 82 may include a sharp cutting edge enabling the film to e cut to fit, or the heat of the pushing member may cause the film to be formed to fit during the pushing process.

It is also possible that the film 4 is fixed to the wall element 2 prior to bonding to the bonding strip 3 by locally bonding the film to one or more of the spacing elements 12a-d, for example with a bonding agent or by means of a heat weld, after which the pushing member 82 is pressed against the film 4 for bonding to the bonding strip 3.

After pushing by the pushing member 82, the support member 81 and the pushing member 82 move away from each other and the formed assembly 1 is released from the pushing member. The assembly is then ready for further processing. For example, a fresh foodstuff which may lose moisture during storage or transportation may be placed in the space 9, shown in FIG. 1G, and this space may be closed at the open side with a subsequent film by bonding it to the flange 100, shown in FIG. 1A, by means of an adhesive or with a heat weld.

The invention claimed is:

1. An assembly comprising:
   a. a wall element, defining a circumferential bonding strip area running over the wall element, and
   b. a flexible flat film connected to the bonding strip with a continuous circumferential bonding, the wall element and film defining two opposite walls of a chamber, characterized in that the wall element further comprises:
   a base plane defined by the wall element,
   at least two corner elements positioned at a distance from one another, which extend substantially perpendicular to the base plane with a height above the base plane of the wall element, each corner element defining an angle of the chamber with an angle line which is substantially perpendicular to the base plane,
   a plurality of strip sections, each strip section connecting two adjacent corner elements, any distance between the strip sections and the base plane being less than said height of the corner elements,
   wherein the circumferential bonding strip area runs over the strip sections and over the corner elements and at least in the area of the corner elements at a distance from the base surface corresponding to said height of the corner elements, and wherein an outer contour of the film corresponds to a contour of the circumferential bonding strip area.

2. The assembly according to claim 1, wherein at least one of the corner elements has a truncated shape including a truncated surface opposite the base plane, which truncated surface extends essentially parallel to the base plane.

3. The assembly according to claim 2, wherein at least one of the corner element has at least two sidewalls interconnected by a third sidewall, the third sidewall being the truncated surface, whereby the bonding strip area runs over these sidewalls.

4. The assembly according to claim 3, wherein at least one of the side walls of each corner element describes an angle of more than 90° with the base plane.

5. The assembly according to claim 1, wherein the strip sections each extend substantially parallel to the base plane.

6. The assembly according to claim 1, wherein each of the strip sections extend at a distance above the base surface of the wall element.

7. The assembly according to claim 1, wherein the film is attached to the bonding strip area free of stretching and/or buckling.

8. The assembly according to claim 1, wherein the film is made of a thermoplastic material.

9. The assembly according to claim 8, wherein the thickness of the thermoplastic material is 250-400 µm.

10. The assembly according to claim 8, wherein the film is bonded to the wall element by fusion welding.

11. The assembly according to claim 1, wherein the wall element is made of thermoplastic material.

12. The assembly according to claim 1, wherein the wall element is designed as a bottom element of a receptacle with one or more side walls extending essentially perpendicular to the bottom element in a direction facing away from the side of the wall element that forms the chamber, to form a space within the side walls.

13. The assembly according to claim 12, wherein the bottom element is provided as a separating element between the chamber and the space, which separating element comprises at least one opening arranged to drain fluid from the space into the chamber, wherein the assembly is provided with a resistive element extending into the chamber which surrounds the outlet in such a manner that the resistive element prevents transport of liquid from the chamber into the space.

14. A method of production of an assembly according to claim 1, comprising the steps of:
 a. placing the film on the bonding strip area of the wall element, whereby the film is brought in contact with the wall element in at least one location,
 b. bonding of the film to the wall element at the location of contact in step a, and
 c. bonding of the film to the wall element over the entire bonding strip area.

15. The method according to claim 14, wherein the wall element comprises one or more connecting elements extending within the chamber perpendicularly from the base surface of the wall element to a height substantially corresponding to the height by which one or more corner elements extend from the base surface of the wall element, and wherein in step a. the film is brought into contact with said one or more connecting elements and wherein in step b. the film is bonded to the one or more connecting elements.

16. The method of claim 14, wherein the film that is placed on the wall element in step a is substantially rectangular with each corner thereof being truncated.

17. The method according to claim 14, wherein said steps (b) and/or (c) comprise the steps of
 placing a support member below the wall element on the side facing away from the corner elements, wherein said support member follows the three-dimensional contours of said wall element and is designed to support the wall element on the side facing away from the corner elements opposite said bonding strip area;
 placing a pushing member above the wall element on the same side thereof as the corner elements, wherein said pushing member follows the three-dimensional contours of the bonding strip area and is arranged to bring the film into at least local contact with the wall element, the pushing member being movable towards the support member or vice versa; and
 causing said support member and said pushing member to move towards one another so as to engage both sides of the wall element.

18. The method according to claim 17, wherein the pushing member is heatable at one or more locations, such that the one or more heatable locations of the pushing member corresponds to the locations on the wall element where the film is joined to the wall element and further including the step, following said causing step of heating said heatable locations of the pushing member to cause bonding of the film to the wall element at the locations on the wall element corresponding to said heatable locations.

* * * * *